United States Patent [19]
Dykes

[11] 4,257,190
[45] Mar. 24, 1981

[54] CROP ROW CENTERING

[75] Inventor: Willis G. Dykes, Vicksburg, Miss.

[73] Assignee: Lasco, Inc., Vicksburg, Miss.

[21] Appl. No.: 84,383

[22] Filed: Oct. 12, 1979

[51] Int. Cl.$^3$ ........................................... A01M 21/04
[52] U.S. Cl. .................................. 47/1.3; 126/271.1; 47/1.7
[58] Field of Search ........................ 47/1.3, 1.43, 1.44, 47/1.5, 1.7; 126/271.1

[56] References Cited

U.S. PATENT DOCUMENTS

| | | | |
|---|---|---|---|
| 2,607,165 | 8/1952 | Rainey | 47/1.3 |
| 2,682,729 | 7/1954 | Poynor | 47/1.3 |
| 3,559,337 | 2/1971 | Marcoux et al. | 47/1.3 |
| 3,683,547 | 8/1972 | Harden | 47/1.7 |
| 3,919,806 | 11/1975 | Pluenneke et al. | 47/1.3 |
| 4,094,095 | 6/1978 | Dykes | 47/1.3 |
| 4,177,603 | 12/1979 | Dykes | 47/1.3 |
| 4,198,781 | 4/1980 | Dykes | 47/1.3 |

FOREIGN PATENT DOCUMENTS 515502  7/1976  U.S.S.R. .................................. 47/1.3

*Primary Examiner*—Robert E. Bagwill
*Attorney, Agent, or Firm*—Cushman, Darby & Cushman

[57] ABSTRACT

A method and apparatus for treating crops in rows to destroy weeds in and adjacent to the crop rows. First and second probes are provided, preferably connected up to a high voltage source of electricity, and mounted so that they extend into crop row from opposite sides thereof. A frame mechanism mounted for movement in a given direction is provided, and the probe mounting structures are pivotally mounted to the frame mechanism for movement about a vertical axis with respect to the frame mechanism. The probe mounting devices are operatively tied together by a turnbuckle assembly or the like, so that the probes will move with each about their respective vertical axes and engage crops in the rows, the crops centering the probes. The probes are also mounted for pivotal movement about a horizontal axis so that they will move out of the way of unyielding obstructions they might encounter. Third and fourth probes also are preferably provided horizontally spaced from the first and second probes, and mounted so that they contact all plants on either side of the crop rows, and after contacting of the plants therewith is terminated the first and second probes contact all of the plants in and around the crop rows. The first and second probes slant backwardly from the frame mechanism, opposite the given direction of movement, while the third and fourth probes are generally perpendicular to the given direction of movement.

30 Claims, 5 Drawing Figures

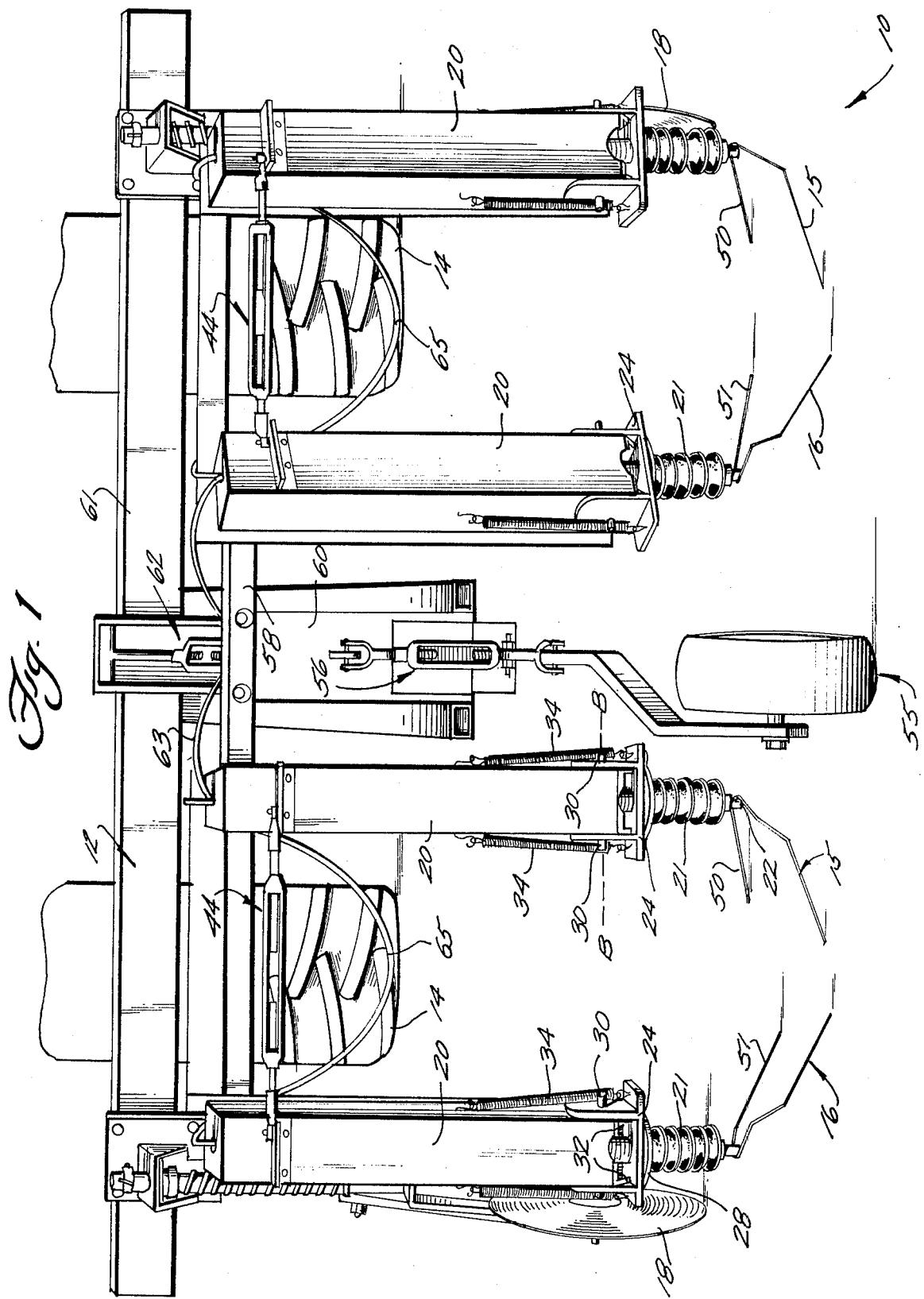

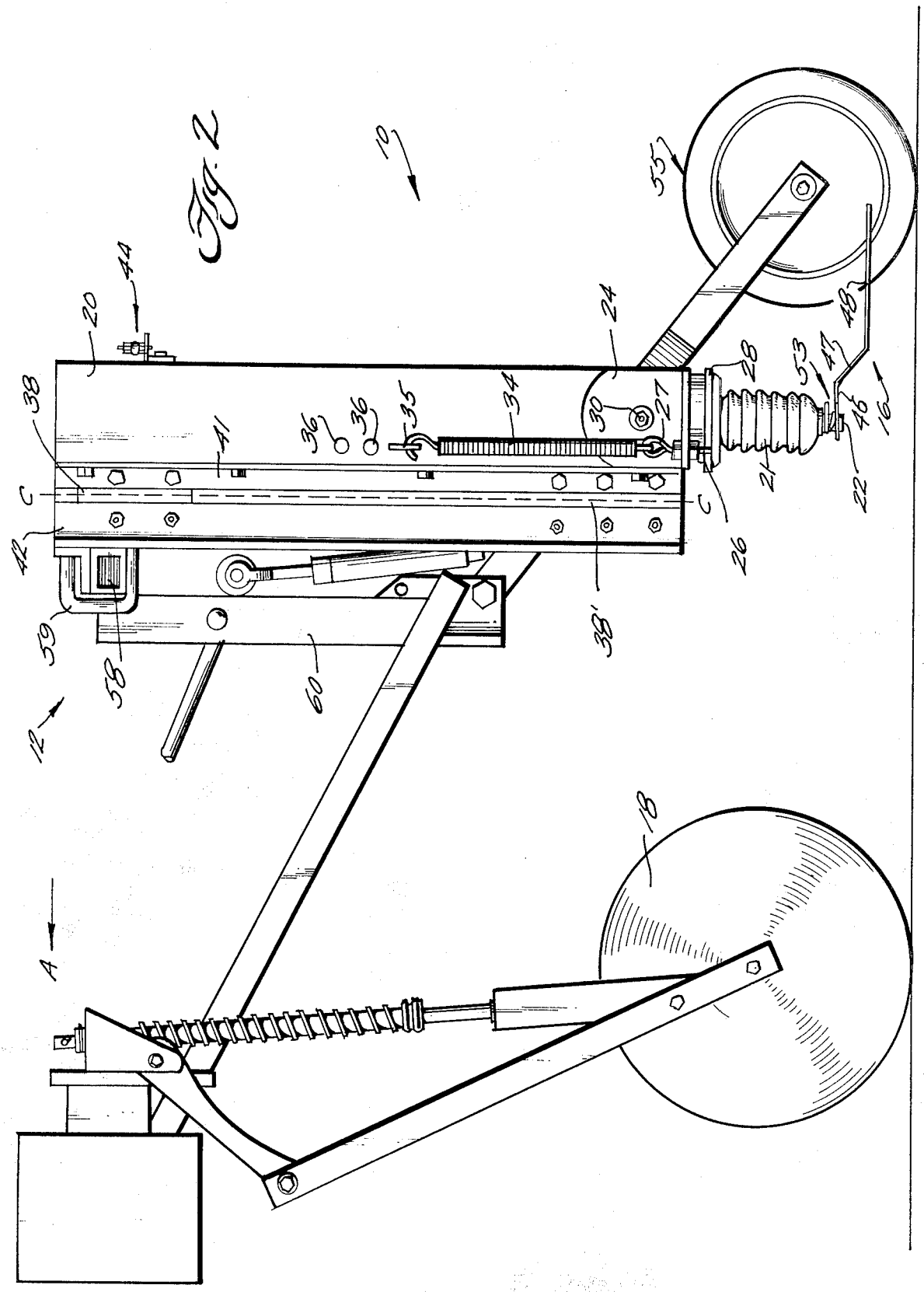

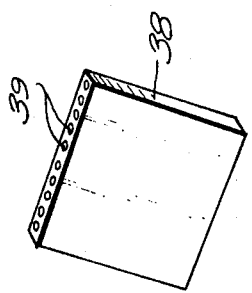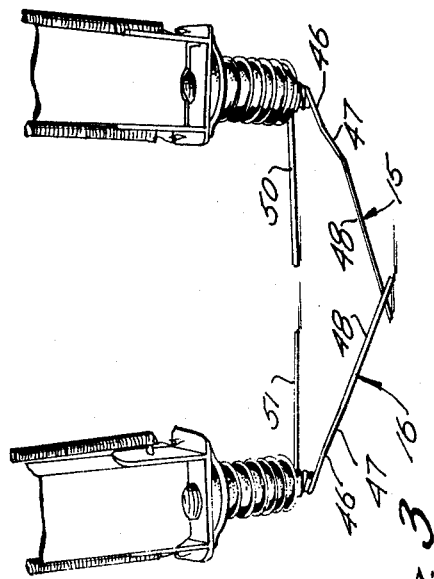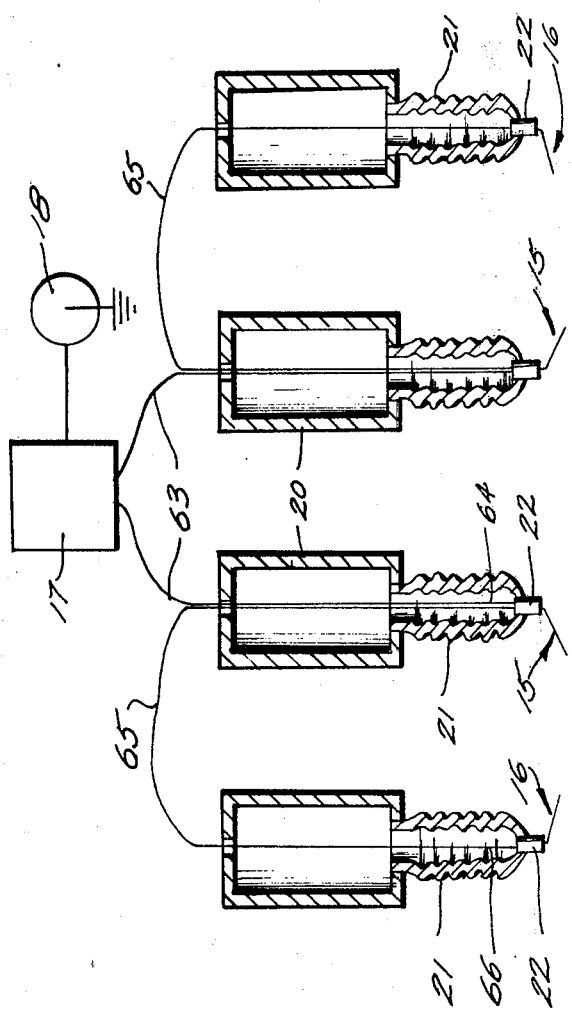

4,257,190

CROP ROW CENTERING

BACKGROUND AND SUMMARY OF THE INVENTION

The invention relates to a method and apparatus for destroying weeds in and around crop rows, preferably utilizing high voltage electricity, and utilizing the geometry of the crop rows to ensure proper positioning of the plant destroying means (e.g., high voltage electricity) utilized. Prior apparatus for destroying plants in and around crop rows, and the like, is disclosed in U.S. Pat. Nos. 3,919,806 and 4,094,095. While the mechanisms disclosed in those patents are useful for a wide variety of situations, they have some limitations in specific situations. For instance, when the tractor driver is not particularly experienced, or wherein operation is taking place under adverse circumstances, sometimes is it difficult to ensure that the plant contacting probes are properly aligned with respect to the crop rows. The present invention, however, by taking advantage of the straight-line geometry of crop rows is able to ensure that the plant destroying probes are generally properly positioned with respect to the crop plants even should the tractor wander slightly.

According to one aspect of the apparatus according to the present invention, there is provided a frame mechanism adapted to move in a given direction; first and second probes; plant destruction means associated with each of the probes; and means for mounting each of said probes so that extend into a crop row from opposite sides thereof. There further is provided first pivot means for mounting each of the probe mounting means for pivotal movement with respect to the frame mechanism about a vertical axis, the vertical axes of the pivot means horizontally spaced from each other so that the probes are mounted on opposite sides of the rows; and means for operatively tying the probe mounting means together so that the probes will move with each other about their respective vertical axes so that they will engage the crops and center the plant destruction means utilizing a crop row.

The plant destruction means preferably comprises a high voltage source of electricity directly connected up to the probes, which are of conductive material. The probes preferably extend at a slant rearwardly away from the frame mechanism, opposite the given direction. Third and fourth probes may also be provided operatively connected to the source of high voltage electricity, the third probe being associated with the first probe and extending toward the crops and the fourth probe being associated with the second probe and extending toward the crops. The third and fourth probes are dimensioned so that they can never horizontally overlap. Means are provided for adjusting the horizontal spacing of the first and second probes so that they may be disposed in a position wherein they horizontally overlap, or in a position wherein they are slightly horizontally spaced from each other.

Second probe means also preferably are provided for mounting the probes for pivotal movement about a horizontal axis opposite the given direction, so that the probes (and ceramic insulators to which they are operatively connected) may move out of the way of unyielding obstructions. Spring means are provided for biasing the probes to a predetermined position so that if a probe is moved by a force about the horizontal axis it will be returned to the predetermined position by the spring means when the force is removed.

The pivot means preferably comprise at least one strip of flexible non-conductive material such as fiber reinforced rubber. Each probe mounting means preferably includes a hollow prism of fiberglass and a ceramic insulator mounted by a yoke for pivotal movement about the horizontal axis with respect to the prism at the bottom thereof. A turnbuckle assembly is provided for tying together the prisms associated with the first and second probes, and preferably gangs of such first and second probes and associated mounting means are provided mounted behind a common frame mechanism.

According to one aspect of the method according to the present invention, weeds are destroyed in and around crop rows utilizing the apparatus described above, the probes being centered with respect to the crop rows by engaging the plants in the crop rows. According to another aspect of the method of the present invention, by utilizing the horizontally staggered first and third and second and fourth probes, or the like plant contacting components, weeds in and around crop rows will be destroyed by practicing the steps of sequentially: contacting all plants on either side of the crop rows with the high voltage source of electricity (third and fourth probes); terminating the contacting (spacing between first and third and second and fourth probes); and contacting all of the plants in and around the crop rows with the high voltage source of electricity (the overlapped first and second probes). It has been found that when a plant is contacted its resistivity unexpectedly and fantastically descreases. If at some later point the same plant is then contacted again, the second contacting probe will do a great deal more damage than the first contacting probe at the same applied voltage conditions. By taking advantage of this fact, and by contacting weeds around the plant rows twice and crops in the plant rows only once, the effectiveness of the weed control practicing the present invention is greatly enhanced.

According to a second aspect of the apparatus according to the present invention, an electrical plant contacting probe assembly for mounting on a vehicle adapted to move in a given direction is provided. The assembly includes a support; a ceramic insulator; a plant contactor of electrically conductive material; and an electrically conductive material member passing through the bottom of the ceramic insulator unconnected to the plant contactor. There is also provided means for mounting the ceramic insulator to the support so that it extends vertically, and for rotation about a horizontal axis opposite said given direction; and spring means for biasing the ceramic insulator to a predetermined position so that if the insulator is moved away from the predetermined position by a force, said spring means will return the insulator to the predetermined position once the force is removed. The plant contactor preferably comprises a spring contact finger having a first portion connected to said member; a second portion extending downwardly from the first portion; and third portion connected to the second portion and extending generally horizontally. In this way, it is possible to mount the insulator so that there is the least possibility of damage thereto or destruction of the dielectric constant thereof by contamination.

It is the primary object of the present invention to provide an effective method and apparatus for destroying weeds in and around crop rows. This and other objects of the invention will become clear from an inspection of the detailed description of the invention, and from the appended claims.

BRIEF DESCRIPTION OF THE DRAWINGS

FIG. 1 is a rear perspective view of exemplary apparatus according to the present invention;

FIG. 2 is a side view of the apparatus of FIG. 1;

FIG. 3 is a top, detail, perspective view illustrating an exemplary relative position of the contacting probes of the apparatus of FIG. 1;

FIG. 4 is a perspective view of an exemplary pivot means utilizing in apparatus of FIG. 1 for mounting the probes for pivotal movement about a vertical axis; and FIG. 5 is a schematic view illustrating the interconnection between the probes and a high voltage source.

DETAILED DESCRIPTION OF THE DRAWINGS

Exemplary apparatus for treating crops in rows to destroy weeds in and adjacent to the crop rows as illustrated generally at 10 in FIG. 1. A frame mechanism 12 is provided which is adapted to move in a given direction A (see FIG. 2), preferably by attachment to a tractor or like vehicle, the tractor rear wheels being illustrated at 14 in FIG. 1. First and second probes 15, 16 are provided, plant destruction means being associated with each of the probes. For instance, a highly accurate chemical spray nozzle can be mounted on each of the probes 15, 16, although preferably the plant destruction means comprises a high voltage source of electricity 17 (see FIG. 5) directly electrically connected to the probes 15, 16, which are of electrically conductive material. The high voltage source 17 can be a generator driven by a PTO shaft from the tractor, and preferably the high voltage source is voltage regulated and means for limiting the current output thereof is provided. Exemplary voltage regulating and current limiting means are described in copending application Ser. No. 859,110, filed Dec. 8, 1977, not U.S. Pat. No. 4,177,603, the disclosure of which is hereby incorporated by reference herein. The high voltage source 17 is grounded by a conventional grounding coulter wheel 18 or the like.

Means are provided for mounting each of the probes 15, 16 so that they extend into a crop row, and from opposite sides thereof. Each mounting means preferably comprises a hollow prism 20 made of fiberglass, or of other material having weight and insulating characteristics comparable to that of fiberglass. The mounting means further include a hollow ceramic insulator 21 or the like mounted to extend generally vertically, and downwardly from the bottom of the prism 20, and an electrically conductive rod 22 or the like extending outwardly from the bottom of the insulator 21. Means are provided (second pivot means) for mounting the insulator 21, and the probes 15, 16 operatively associated there-with, for rotation about a horizontal axis B—B (see FIG. 1) with respect to the prism 20 so that the insulator 21 can move out of the way of unyielding obstructions that it may encounter during movement of the apparatus in the direction A. Such mounting means preferably comprises a yoke 24 of a material the same as, or comparable to, the material for the support prism 20, a plurality of screw fasteners 26 having eyelets 27 for attaching the yoke 24 to a plate 28 integral with the insulator 21, and a pivot pin (or pins) 30 extending along the axis B—B between the yoke 24 and support prism 20 for providing relative pivotal movement therebetween.

Preferably the mounting means for the ceramic insulator allows rotation thereof about the horizontal axis B—B only in one direction—a direction opposite the given direction A. This is accomplished by forming the trailing bottom edge surfaces 32 of the prism 20 so that they are rounded, while the leading surfaces thereof (not shown) are square. The bottom of the yoke 24 will thus not be prevented from rotating about the pins 30 by the rounded surfaces 32, however, the square surfaces will engage the bottom of the yoke 24 and will provide a stop preventing rotation of the yoke 24 about the pins 30 toward the prism 20 leading edges.

Spring means are also provided for biasing the ceramic insulator 21, and probes 15, 16, associated therewith, to a predetermined original position (in which predetermined original position—see the position in FIG. 2—the insulator 21 is generally vertical). Such spring means preferably comprise one or more coil springs 34 operatively connected at one end thereof to the eyelet 27 and operatively connected at the other end thereof to a connecting member 35 which in turn is operatively connected to the support prism 20. Preferably the fastener 35 comprises a screw threaded hook-shaped or eyeleted fastener, and preferably a plurality of vertically spaced adjustment holes 36 (see FIG. 2) are provided in the prism 20 for allowing adjustment of the tension of the spring 34 depending upon which opening 36 the fastener 35 is associated with.

The apparatus according to the present invention also comprises first pivot means for mounting each of the probe mounting means 20, etc., for pivotal movement with respect to the frame mechanism 12 about a vertical axis C—C (see FIG. 2). The vertical axes C—C of the various probe mounting means 20, etc., are horizontally spaced from each other so that the probes 15, 16 are mounted on opposite sides of the crop rows. Such horizontal spacing is clearly evident in FIG. 1. Preferably the first pivot means comprise at least one strip of flexible non-conductive material 38 which is operatively mounted between the prism 20 and the frame mechanism 12. Preferably the strip 38 is fiber reinforced rubber, the fibers being indicated at 39 in FIG. 4. The fiber reinforcement is important for resisting any tendency of the material to tear due to the loading on the mount 20, etc., during use and especially suitable material is rubber conveyor belt material reinforced with cotton (e.g., two-ply, four-ply, etc., conveyor belting material). In the embodiment illustrated in drawings, two separate strips 38, 38' of flexible non-conductive material are provided as the first pivot means. The bottommost strip 38' has a heavier construction (e.g., it is thicker and/or has more fiber reinforcement or more plies) than the topmost strip 38 so that it can more effectively resist tearing forces than the topmost strip. Suitable structure for fastening the strips 38, 38' to the structures 20, 12 include rigid plate portions 41, 42 respectively connected to the prism 20 and frame mechanism 12, a pair of each of the plate members 41, 42 being provided, one disposed on either side of the flexible strips 38, 38', and bolts 43, 44 passing through the pairs of plates 41, 42, respectively, and the flexible strips 38, 38', to mount them so they serve as pivot means.

The apparatus according to the invention further comprises means for operatively tying the probe mounting means (20) together so that the probes 15, 16 will move with each other about their respective vertical axes C—C so that the probes will engage the crops and center the plant destruction means utilizing a crop row.

Such tying means preferably comprises turnbuckle assembly 44 (see FIG. 1). The turnbuckle assembly allows adjustment of the relative spacing of the probes 15, 16 (their exact pivotal position about the flexible strips 38, 38') so that the probes 15, 16 may be overlapped (see FIG. 3), or so that they can be spaced slightly from each other. In situations where the mechanical resistance encountered by the probes will be especially great (such as in heavy stands of wheat), the turnbuckle assembly 44 is adjusted so that the probes 15, 16 overlap a great deal. At the other extreme, for situations where the mechanical resistance is small, such as with young cotton plants, the assembly 44 would be adjusted so that there is a very small gap between the probes 15, 16. Under some circumstance, it may be desirable to provide a damping means between the probe mounting structures 20, etc., such as a pneumatic-pot operatively connected to each of the prisms 20 associated with the turnbuckle assembly 44.

The exact nature and shape of the contacting probes 15, 16, and associated structures, can be important in effectively achieving efficient operation of the apparatus. The probes 15, 16 are designed so that they slant rearwardly away from the frame mechanism 12, as seen most clearly in FIGS. 1 and 2, opposite the given direction A. By so constructing these probes the dwell time of contact of plants directly in the crop rows is reduced relative to the dwell of contact of plants around (on either side of) the crop rows, resulting in a more effective selective killing of weeds. Additionally, the probes 15, 16 preferably are constructed as spring contact rods, as illustrated in the drawings, having a given spring constant which is selected such that relatively stiff crop plants will deflect the spring contacts while relatively flexible weeds will not, resulting in a longer dwell time of contact with weeds than crop plants. Also, it is preferable to mount the insulators 21 as high above the ground as possible. The closer the insulators are to the ground the more material (dirt, etc.) will build up on the exterior of the insulators, which will reduce the dielectric constant thereof. When this happens there can be arching over the insulator, which arcing is highly undesirable. The maintenance of the insulators 21 high above the ground yet providing the probes 15, 16 close to the ground (which also is desirable) is accomplished by particularly shaping the probes 15, 16. As illustrated most clearly in FIGS. 2 and 3, the probes 15, 16 are designed so that they have a first portion 46 connected to the conductive rod 22 mounted by the insulator 21; a second portion 47 extending downwardly from the first portion 46 (preferably making an angle both with respect to the vertical and horizontal); and a third portion 48, which actually does the contacting, that is connected to the second portion 47 and extends generally horizontally (although exact horizontal extension is not necessary).

Preferably, it is also desirable to provide third and fourth probes 50, 51 with the apparatus according to the present invention. The third and fourth probes 50, 51 are also operatively connected up to the high voltage source 17. The third probe 50 is associated with the first probe 15 and extends toward the crops, and the fourth probe 51 is associated with the second probe 16 and extends toward the crops, and the probes 50, 51 are dimensioned so that they can never horizontally overlap. The probes 50, 51 can be of any suitable construction, such as elongated pans, plates or the like. In the embodiment illustrated in the drawings, the probes 50, 51 are merely extensions of the same spring contact material forming the probes 15, 16, the spring contact material being wrapped around the rod 22, this wrap-around being illustrated at 53 in FIG. 2. As illustrated most clearly in FIGS. 2 and 3, the probes 50, 51 are also horizontally spaced from the probes 15, 16, respectively, in the direction of movement A.

By providing the probes 50, 51 with the probes 15, 16 as discussed above, two beneficial results are achieved. First of all, the plants outside of the plant rows (which are weeds rather than crops) are contacted twice, both by the third and first or second and fourth probes, while the plants actually in the crop rows (which are mostly crops) are contacted only once, by the first or second probe. Also, according to the present invention it has been found that the resistivity of a plant unexpectedly and fantastically decreases once it is contacted. When it is then contacted a second time substantially immediately after the first contacting, the second contacting will do much more damage to the plant than the first contacting even though the applied voltage is the same at the first and second contactings.

The frame mechanism 12 may comprise any conventional or suitable arrangement. Preferably, a gauge wheel assembly 55 is associated with the frame mechanism 12 for properly vertically positioning the probes 15, 16. A conventional gauge wheel turnbuckle assembly 56 or the like is provided to provide for adjustment of the vertical position of the probes.

The exemplary frame mechanism illustrated in the drawings includes a horizontally extending main, rearmost support bar 58 to which the various gangs of probes 15, 16 are connected. Such connection may be effected by providing U-shaped supports 59 (see FIG. 2 in particular) connected to the plates 42 associated with each probe mount 20, etc., the U-shaped bolts 59 allowing ready movement of the plates 42 onto the square cross-section support bar 58 from the ends thereof, and exact positioning and the tightening thereof into place. A main support structure 60 is provided in the center of the bar 58. The main support structure 60 is connected to in a more anterior frame component 61 (which is directly connected to the tractor and may mount to the high voltage source 17) by the turnbuckle assembly 62, which of course allows adjustment therebetween.

As illustrated in FIG. 5, one preferred way to connect up the high voltage source 17 to the probes 15, 16 is to provide a first high voltage insulated line portion 63 extending from the source 17 and terminating in an uninsulated portion 64 attached to the rod 22 within the interior of the hollow insulator 21 associated with the first probe 15; and a second high voltage insulated line portion 65 extending from the portion 64 and terminating in an uninsulated portion 66 within the hollow insulator 21 associated with the second probe 16 (and connected to the conductive rod 22 associated with that insulator 21).

The apparatus heretofore described is used in practicing the following method:

The turnbuckle assembly 44 associated with each gang of first and second probes 15, 16 is adjusted to take into account the thickness, resistivity, size, etc., of the crops in the crop rows with which the apparatus is to be used, and the U-bolts 59 are positioned along the support rod 58 of the frame assembly 12 so that the probes 15, 16 of the gangs are spaced apart the appropriate distance. The tension of the springs 34 is appropriately adjusted by adjusting the positions of the fasteners 35 in the openings 36, the vertical height of the probes 15, 16 above the ground is adjusted by utilizing the turnbuckle assembly 56, and the entire apparatus 10 is moved into operative association with the ground, with the gauge wheel 55 on the ground, the wheel coulters 18 penetrating the ground, and the probes 15, 16 substantially horizontal.

The vehicle powering the frame 12 is then moved along the ground in direction A with the probes 15, 16 extending in the opposite direction. As the probes 15, 16 extend into the crop rows, they will engage the crop plants and will pivot about the flexible strips 38, 38' so that they are always properly positioned with respect to the crop rows despite the fact that the vehicle pulling the apparatus 10 may wander slightly. Plants outside of the crop rows will be contacted first by the probes 50 or 51, and then subsequently by the probes 15, 16, while plants in the crop rows will be contacted only by the tips of probes 15, 16, and the dwell time on crop plants will be significantly less than on flexible weeds, or on any plants outside of the crop rows. Should the insulators 21 encounter any obstructions, they will be pivoted about the axes B—B out of the way of the obstruction and then returned to their original, vertical position by the springs 34.

While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. Apparatus for treating crops in rows to destroy weeds in and adjacent to the crop rows, comprising
   a frame mechanism adapted to move in a given direction;
   first and second probes;
   plant destruction means associated with each of said probes;
   means for mounting each of said probes so that they extend into a crop row, and from opposite sides thereof;
   first pivot means for mounting each of said probe mounting means for pivotal movement with respect to said frame mechanism about a vertical axis, the vertical axes of said pivot means horizontally spaced from each other so that said probes are mounted on opposite sides of said rows; and
   means for operatively tying said probe mounting means together so that said probes will move with each other about their respective vertical axes so that said probes will engage said crops and center said plant destruction means utilizing a crop row.

2. Apparatus as recited in claim 1 wherein said plant destruction means comprises a high voltage source of electricity, said high voltage source of electricity being directly connected to said probes, and wherein said probes extend at a slant away from said frame mechanism, opposite said given direction.

3. Apparatus as recited in claim 2 wherein said plant destruction means further comprises third and fourth probes, said third and fourth probes also operatively connected to said source of high voltage electricity, said third probe being associated with said first probe and extending toward said crops, and said fourth probe being associated with said second probe and extending toward said crops, said third and fourth probes being dimensioned so that they can never horizontally overlap.

4. Apparatus as recited in claims 2 or 3 further comprising means for adjusting the horizontal spacing of said first and second probes so that said probes may be disposed in a position wherein they horizontally overlap, or in a position wherein they are slightly horizontally spaced from each other.

5. Apparatus as recited in claims 2 or 3 further comprising second pivot means for mounting each of said probes for pivotal movement about a horizontal axis, opposite said given direction, and spring means for biasing each of said probes to a predetermined position so that if a said probe is moved by a force about said horizontal axis, it will be returned to said predetermined position by said spring means when the force is removed.

6. Apparatus as recited in claim 1 wherein said first pivot means comprises at least one strip of flexible non-conductive material operatively mounted between each of said probe mounting means and said frame mechanism.

7. Apparatus as recited in claim 6 wherein said flexible non-conductive material is fiber reinforced rubber.

8. Apparatus as recited in claims 6 or 7 said first pivot means for mounting each of said probe mounting means to said frame mechanism comprises two vertically spaced strips of said flexible non-conductive material, the bottommost strip having a heavier construction than the topmost strip so that it can more effectively resist tearing forces than said topmost strip.

9. Apparatus as recited in claims 2 or 3 wherein each of said probes is of flexible conductive material having a spring constant such that weeds will be ridden over thereby, and crop plants will deflect them.

10. Apparatus as recited in claim 2 wherein each of said first and second probes comprises a spring contact finger operatively connected to a generally vertical ceramic insulator or the like; said spring contact finger comprising a first portion connected to a conductive rod mounted by said insulator; a second portion extending downwardly from said first portion; and a third portion connected to said second portion and extending generally horizontally.

11. Apparatus as recited in claim 10 wherein said second portion extends at a slant both with respect to the vertical and horizontal.

12. Apparatus as recited in claims 2 or 6 wherein each of said probe mounting means comprises a hollow prism of material having weight and insulating properties generally comparable to fiberglass.

13. Apparatus as recited in claim 1 wherein said operatively tying means comprises a turnbuckle assembly.

14. Apparatus as recited in claim 1 further comprising a gauge wheel assembly associated with said frame mechanism for properly vertically positioning said probes; and means for adjusting said gauge wheel assembly to thereby adjust the vertical position of said probes.

15. Apparatus as recited in claim 2 wherein each of said probe mounting means includes a hollow ceramic insulator or the like having a conductive rod extending from the bottom thereof, the probe with which said means is associated being operatively connected to said rod; and a first high voltage insulated line portion extending from said high voltage source of electricity and terminating in an uninsulated portion attached to the rod within the hollow insulator of the first probe mounting means; and a second high voltage insulated line portion extending from said uninsulated portion of said first line portion and terminating in an uninsulated portion within the hollow insulator associated with the second probe mounting means.

16. An electrical plant contacting probe assembly for mounting on a vehicle adapted to move in a given direction, comprising a support; a ceramic insulator; a plant contactor of electrical conductive material; an electrically conductive material member passing through the bottom of said ceramic insulator and connected to said plant contactor; means for mounting said ceramic insulator to said support so that it extends vertically, and for rotation about a horizontal axis opposite said given direction; and spring means for biasing said ceramic insulator to a predetermined position so that if said insulator is moved away from said predetermined position by a force, said spring means will return said insulator to said predetermined position once the force is removed.

17. An assembly as recited in claim 16 wherein said plant contactor of electrically conductive material extends rearwardly from said ceramic insulator, opposite said given direction.

18. An assembly as recited in claim 17 wherein said plant contactor comprises a spring contact finger having a first portion connected to said member; a second portion extending downwardly from said first portion; and a third portion connected to said second portion and extending generally horizontally.

19. An assembly as recited in claim 16 wherein said means for mounting said ceramic insulator for rotation comprises means for allowing rotation about said horizontal axis only in one direction.

20. An assembly as recited in claim 16 wherein said support comprises a hollow prism of material having weight and insulating properties generally comparable to fiberglass; and wherein said insulator mounting means comprises a yoke of a material the same as or comparable to said support, means for releasably attaching said yoke to said insulator; and a pivot pin extending between said yoke and said support for providing relative pivotal movement there between.

21. An assembly as recited in claim 20 wherein said releasable attaching means comprises at least one fastener having an eyelet portion, and wherein said spring means comprises at least one coil spring operatively connected to said eyelet portion and to a connecting member operatively connected to said support.

22. A method of destroying weeds in and around crop rows comprising the steps of sequentially
    (a) contacting all plants, and only those plants, on either side of the crop rows with a high voltage source of electricity;
    (b) terminating the contacting in (a); and
    (c) immediately contacting all of the plants in and around the crop rows with the high voltage source of electricity.

23. A method as recited in claim 22 wherein step (c) is practiced by providing a larger dwell time of contact of plants outside of the crop rows than plants directly in the crop rows.

24. A method as recited in claim 22 wherein step (c) is practiced by providing electrically conductive spring members as actual plant contacting components for contacting plants in the crop rows, each spring member having a spring constant such that relatively stiff crop plants will deflect it while relatively flexible weeds will not; and by providing a larger dwell time of contact between the spring members and the relatively flexible weeds than the dwell time of contact between the spring members and the relatively stiff crop plants.

25. A method for treating crops in rows to destroy weeds in and adjacent to the crop rows utilizing first and second probes having plant destruction means associated therewith; comprising the steps of
    mounting the probes so that they extend toward each other and toward contact with crop plants in the crop rows, from opposite sides of the crop rows and for relative, tied-together, movement with respect to the crop rows; and
    moving the probes in a given direction so that the probes move with respect to the crop plants in a crop row, the probes being centered with respect to the crop rows by engaging the plants in the crop rows.

26. A method as recited in claim 25 comprising the further step of mounting the probes for pivotal movement opposite said given direction out of the way of an unyielding obstruction should they encounter an unyielding obstruction during movement thereof in said given direction.

27. A method as recited in claim 25 comprising the further step of mounting the probes so that they slant rearwardly, opposite said given direction.

28. Apparatus for treating plants comprising a high voltage source of electricity mounted on a vehicle adapted to move in a given horizontal direction, a spring contact finger; means for electrically connecting the spring contact finger to the high voltage source; a substantially vertical ceramic insulator operatively physically associated with the finger; and wherein the improvement comprises:
    said spring contact finger comprising a first portion operatively physically associated with said insulator; a second portion extending downwardly from said first portion; and a third portion connected to said second portion and extending generally horizontally.

29. Apparatus as recited in claim 28 wherein said second portion extends at a slant both with respect to the vertical and horizontal.

30. Apparatus as recited in claim 28 wherein said finger extends opposite said given direction at a slant both with respect to opposite said given direction and a horizontal perpendicular to said given direction.

* * * * *